(12) United States Patent
Rosenfeld et al.

(10) Patent No.: US 11,046,371 B2
(45) Date of Patent: Jun. 29, 2021

(54) SYSTEM FOR CONVEYING AND STOWING ELONGATED MATERIAL

(71) Applicant: SAMSON LOGIC TRANSPORATION LTD, Ramat Hasaron (IL)

(72) Inventors: Yehiel Rosenfeld, Haifa (IL); Shai Alexander Prupes, Tel Aviv (IL)

(73) Assignee: SAMSON LOGIC TRANSPORTATION LTD., Ramat Hasaron (IL)

( * ) Notice: Subject to any disclaimer, the term of this patent is extended or adjusted under 35 U.S.C. 154(b) by 0 days.

(21) Appl. No.: 16/065,922

(22) PCT Filed: Dec. 28, 2016

(86) PCT No.: PCT/IL2016/051388
§ 371 (c)(1),
(2) Date: Jun. 25, 2018

(87) PCT Pub. No.: WO2017/115363
PCT Pub. Date: Jul. 6, 2017

(65) Prior Publication Data
US 2019/0009838 A1 Jan. 10, 2019

Related U.S. Application Data

(60) Provisional application No. 62/271,436, filed on Dec. 28, 2015.

(51) Int. Cl.
*B62D 33/02* (2006.01)
*B65G 1/02* (2006.01)
(Continued)

(52) U.S. Cl.
CPC .......... *B62D 33/0207* (2013.01); *B25H 3/04* (2013.01); *B60R 9/06* (2013.01); *B65G 1/023* (2013.01);
(Continued)

(58) Field of Classification Search
CPC ............ B62D 33/0207; B62D 21/0215; B62D 2519/00971; B62D 9/385; B65G 1/10;
(Continued)

(56) References Cited

U.S. PATENT DOCUMENTS 5,379,904 A * 1/1995 Brown .................. A47F 7/0042
211/175
5,609,451 A * 3/1997 McCorkle, Jr. ........... B60P 7/13
211/194
(Continued)

FOREIGN PATENT DOCUMENTS

CN 202508540 U 10/2012
CN 103848152 * 6/2014
(Continued)

OTHER PUBLICATIONS

JP 2014237462 Machine Translation, from espacenet, see document for URL, retrieved Oct. 29, 2019. (Year: 2014).*
(Continued)

*Primary Examiner* — Adam J Waggenspack
(74) *Attorney, Agent, or Firm* — William Dippert; Laurence Greenberg; Werner Stemer

(57) ABSTRACT

A rack corresponding a vehicle having matching connectors: a plurality of modular shelves having two longitudinal sides, the modular shelves are configured to be mounted one on top of the other, wherein each modular shelf of the plurality of modular shelves comprising: a frame having a plurality of struts configured for mounting a modular shelf one on top of the other, and wherein at least a portion of the struts have
(Continued)

bottom with fittings that comply with the matching connectors a guardrail on each longitudinal side of the frame wherein at least one of the guardrails is capable of moving between an upright position and a horizontal position. a drawer capable of moving on top of the frame through at least one of the longitudinal sides of the modular shelf.

11 Claims, 13 Drawing Sheets

(51) Int. Cl.
| | |
|---|---|
| B60R 9/06 | (2006.01) |
| B65G 1/04 | (2006.01) |
| B25H 3/04 | (2006.01) |
| B65G 1/14 | (2006.01) |
| B65G 1/20 | (2006.01) |
| B65G 57/00 | (2006.01) |
| B65G 57/09 | (2006.01) |
| B65G 57/18 | (2006.01) |

(52) U.S. Cl.
CPC ........... *B65G 1/026* (2013.01); *B65G 1/0442* (2013.01); *B65G 1/14* (2013.01); *B65G 1/20* (2013.01); *B65G 57/005* (2013.01); *B65G 57/09* (2013.01); *B65G 57/18* (2013.01); *B65G 2207/30* (2013.01)

(58) Field of Classification Search
CPC ........ B65G 1/026; B65G 1/0442; B65G 1/14; B65G 57/18; B65G 57/005; B65G 2207/30; B25H 3/04; B60R 9/06; A47B 47/0091; A47B 87/0223; A47F 5/10; A47F 5/0081; A47F 5/005; A47F 5/0018
USPC ........................................................ 224/405
See application file for complete search history.

(56) References Cited

U.S. PATENT DOCUMENTS

| | | | | |
|---|---|---|---|---|
| 5,931,527 A | * | 8/1999 | D'Onofrio | B60R 5/045 297/146 |
| 6,123,208 A | * | 9/2000 | Haenszel | A47B 45/00 108/55.1 |
| 6,467,856 B1 | * | 10/2002 | Chang | A47F 5/10 211/134 |
| 6,655,538 B2 | * | 12/2003 | Saulnier-Matteini | A47B 45/00 211/105.1 |
| 6,834,768 B2 | * | 12/2004 | Jersey | A47B 45/00 211/175 |
| 6,976,598 B2 | * | 12/2005 | Engel | A47B 57/06 211/175 |
| 7,802,526 B2 | * | 9/2010 | Brady | B65D 19/12 108/53.5 |
| 9,434,584 B2 | * | 9/2016 | Parrish | B29D 30/0016 |
| 10,414,342 B2 | * | 9/2019 | Williams | B60R 5/003 |
| 2014/0209499 A1 | * | 7/2014 | Hobson | B65D 19/42 206/503 |
| 2018/0361939 A1 | * | 12/2018 | Hughes | B60R 5/045 |

FOREIGN PATENT DOCUMENTS

| | | |
|---|---|---|
| CN | 103848152 A | 6/2014 |
| EP | 0029073 B1 | 12/1983 |
| JP | 2014237462 A * | 12/2014 |
| JP | 2014237462 A | 12/2014 |
| WO | 2013079121 A1 | 6/2013 |

OTHER PUBLICATIONS

CN 103848152 Machine Translation, from espacenet, see document for URL, retrieved Oct. 25, 2019. (Year: 2014).*

* cited by examiner

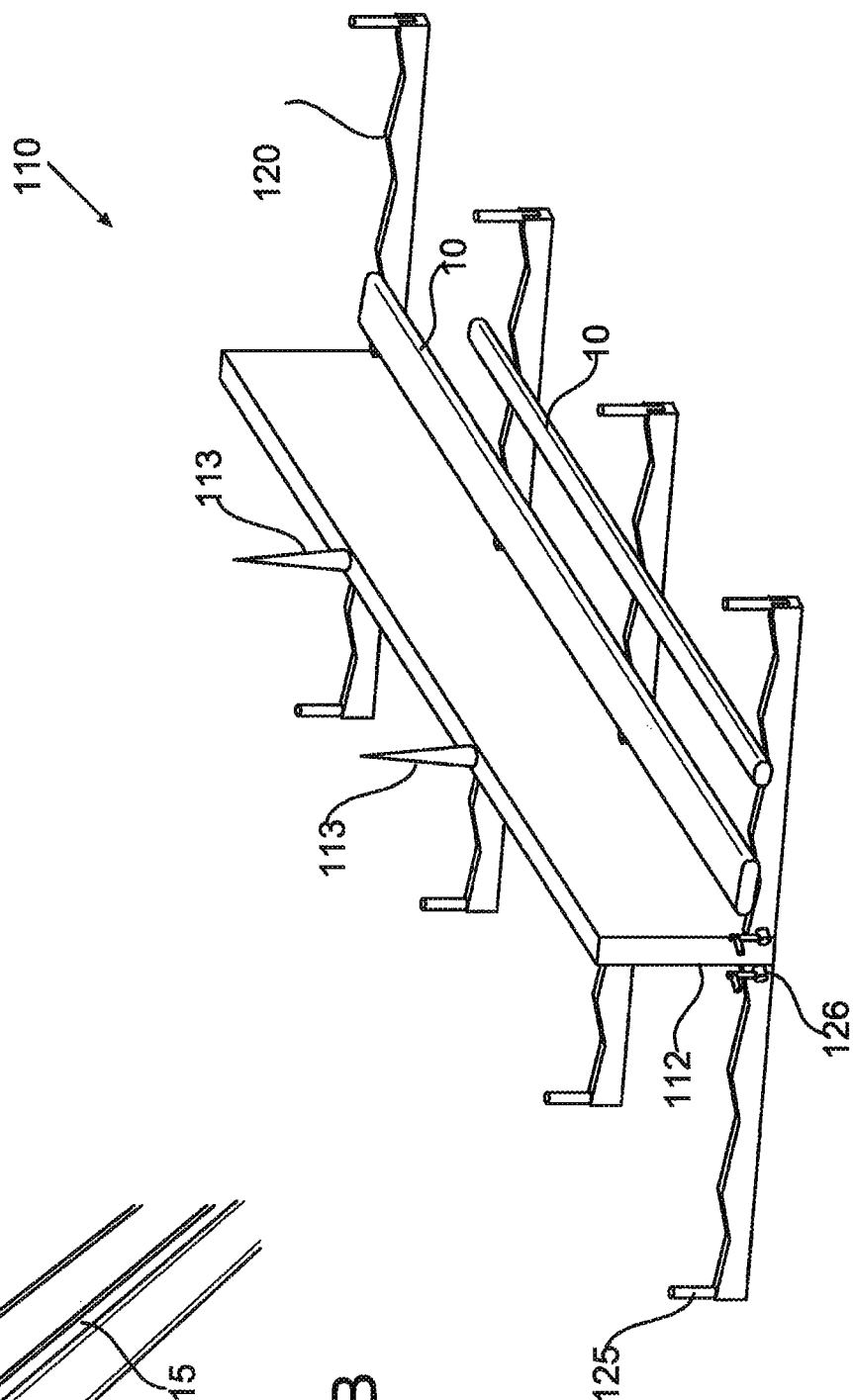
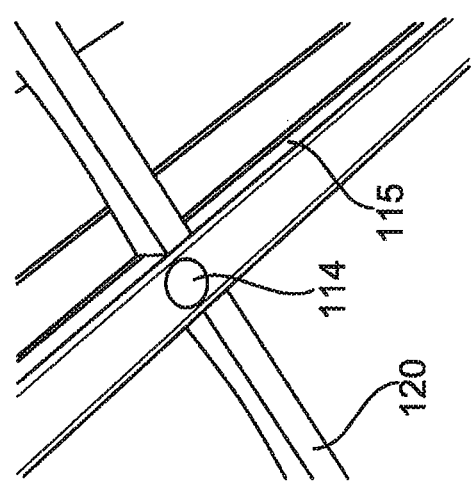
FIG. 2A
FIG. 2B

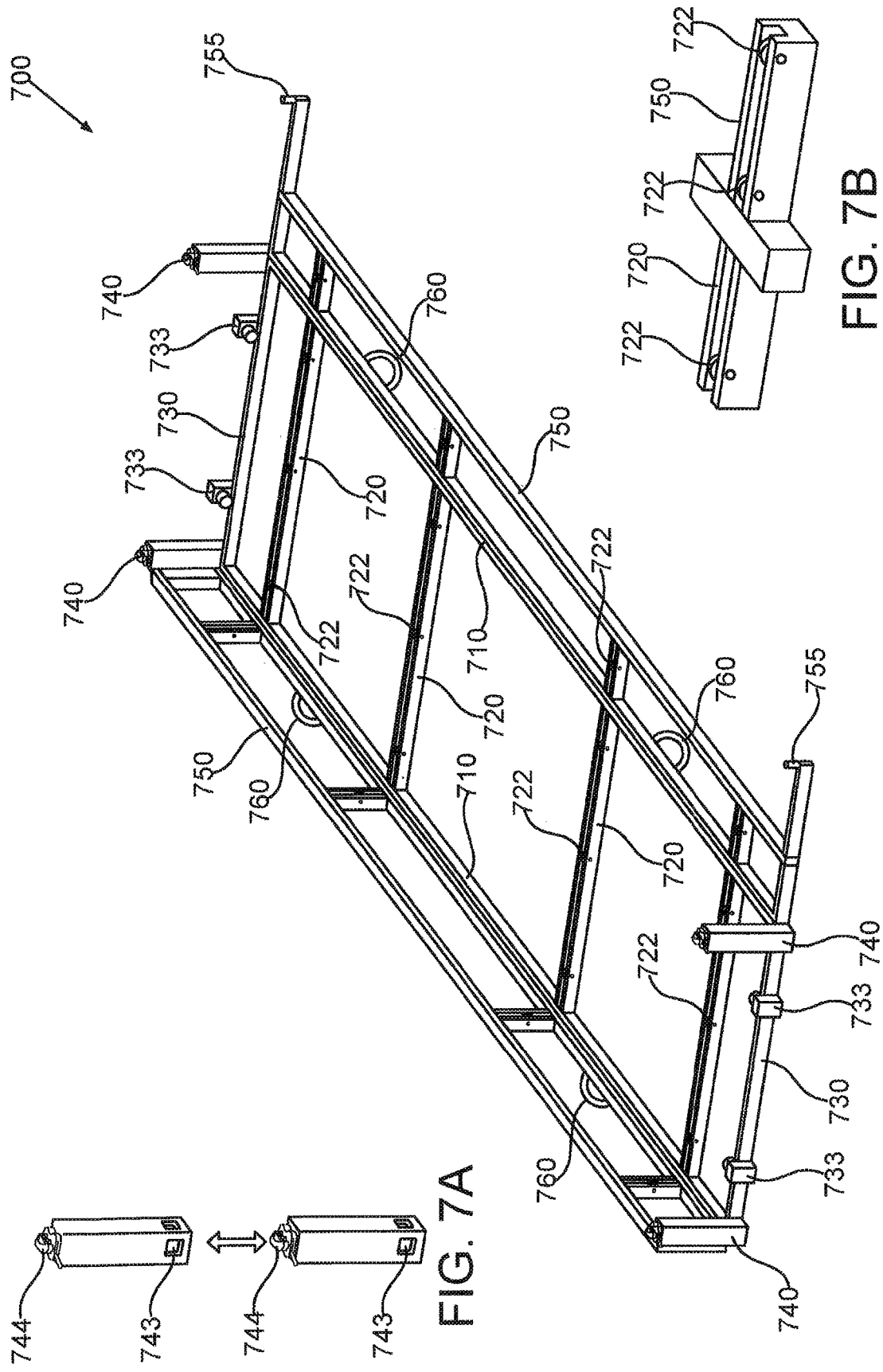

SYSTEM FOR CONVEYING AND STOWING ELONGATED MATERIAL

The present application is a National Phase filing under 35 U.S.C. § 371 of International Patent Application No. PCT/IL2016/051388, filed Dec. 28, 2016, which is based upon and claims the benefit of the priority date of U.S. provisional patent application Ser. No. 62/271,436, filed Dec. 28, 2015, each of which is incorporated herein by reference.

TECHNICAL FIELD

The present disclosed subject matter relates to shipping and handling. More particularly, the present disclosed subject matter relates to shipping, conveying and storing elongated construction material.

BACKGROUND

Bars are used at locations such as construction sites for purposes such as to strengthen structures built at the sites. These bars are typically found strewn about at the site for lack of any means that is suitable for both securely holding the bars and allowing easy access to any particular bar, since the bars are typically required in various lengths or even shapes, and a particular bar only will fit for a specific use.

Scattering the bars theoretically allows easier access to the particular bar rather than sorting through a closely packed bundle, particularly if the bars are identifiable with labels attached thereto. However, in fact the scattered bars end up being mixed in sizes, and the labels getting torn, such that locating the appropriate bar is actually very time-consuming. Moreover, the bars occupy a very large and precious area, hinder movement around the site, and might get warped, stuck in mud etc. One object of the invention is to minimize the occupancy of space by the bars at the building site, and store them in an easily accessible and organized manner.

Transportation and storage of the bars elsewhere pose additional problems. The bars are typically laid on the ground for a while and then loaded onto a truck at the factory with the aid of the truck driver and a worker that ties the bars, and unload it at the building site with the aid of the truck driver and another worker that engages and disengages the crane's hook from bundles of bars. The loading and unloading each typically require precious time of the workers' and truck's presence. One object of the invention is to shorten the times.

BRIEF SUMMARY

According to a first aspect of the present disclosed subject matter A rack corresponding a vehicle having matching connectors: a frame comprising fittings complying with the matching connectors; a plurality of modular shelves configured to be mounted one on top of the other and on the frame, wherein each modular shelf of the plurality of modular shelves comprises a wall that is vertical with respect to the frame, wherein the wall has two sides, and wherein each side comprising: a plurality of arms configured to be simultaneously extracted and retracted; and wherein the arms are capable of moving along the wall.

In some exemplary embodiments, the matching connectors are twist locks and wherein the fittings are configured to engage with the twist locks for connecting the rack to the vehicle.

In some exemplary embodiments, a top side of the wall comprises a plurality of pins and a bottom side of the wall comprises a plurality of matching bores, so that when the shelves are mounted one on top of the other, the pins and bores are engaged.

In some exemplary embodiments, the frame further comprises a plurality of pins along its longitudinal axis so that when a shelf of the plurality of shelves is mounted on top of the frame, the pins and bores are engaged.

In some exemplary embodiments, each arm comprises a chock positioned at a far end of the arm wherein the chock can be moved between an upright position and downward position.

In some exemplary embodiments, the chock further comprises a ring.

In some exemplary embodiments, the plurality of arms is simultaneously extracted and retracted by a leverage mechanism operated manually or electromechanically.

In some exemplary embodiments, the modular shelves are secured to each other with fastening latches.

In some exemplary embodiments, the frame comprises a modular shelf which is an integral part of the frame.

According to another aspect of the present disclosed subject matter, a rack corresponding a vehicle having matching connectors: a plurality of modular shelves having two longitudinal sides, the modular shelves are configured to be mounted one on top of the other, wherein each modular shelf of the plurality of modular shelves comprising: a frame having a plurality of struts configured for mounting a modular shelf one on top of the other, and wherein at least a portion of the struts have bottom with fittings that comply with the matching connectors a guardrail on each longitudinal side of the frame wherein at least one of the guardrails is capable of moving between an upright position and a horizontal position. A drawer capable of moving on top of the frame through at least one of the longitudinal sides of the modular shelf.

In some exemplary embodiments, each strut has a bottom and a top and wherein a fitting is provided at the bottom and a twist lock is provided at the top.

In some exemplary embodiments, the shelves are mounted one on top of the other by engagement of the fittings and the twist locks.

In some exemplary embodiments, the fittings of the struts are configured to connect with the matching connectors wherein the matching connectors are twist locks.

In some exemplary embodiments, the fittings are also utilized for loading and unloading the rack on and off a vehicle.

In some exemplary embodiments, the drawer carry elongated material, wherein the guardrail is in up-right position to prevent the elongated material from falling off the drawer, and wherein guardrail is in horizontal position to enable movement of the drawer.

In some exemplary embodiments, the frame is provided with a plurality of wheel-bearings that facilitate the drawer to move.

In some exemplary embodiments, the guardrail is provided with a plurality of wheel-bearings that facilitates the drawer to move when the guardrail is in horizontal position.

In some exemplary embodiments, at least two extenders of the guardrail and a plurality of guides keep the drawer on track and prevent it from tipping over.

In some exemplary embodiments, at least one of the drawers is fixed to the frame.

In some exemplary embodiments, the guardrail of one of the longitudinal sides is fixed in an up-right position, and wherein the drawer can move solely through an opposite side to the guardrail that is fixed.

According to yet another aspect of the present disclosed subject matter, a shelf having two longitudinal sides comprising: a frame having a plurality of struts configured for mounting a modular shelf on top of another shelf having corresponding struts; a guardrail on each longitudinal side of the frame wherein at least one of the guardrails is capable of moving between an upright position and a horizontal position.

In some exemplary embodiments, the shelf is configured to be populated within a ladder stand having at least two corresponding heavy duty sliding rails onto which the shelf is received.

In some exemplary embodiments, the shelf is configured to be populated within a u-stand have at least two corresponding heavy duty wheel-bearings rows onto which the shelf is received.

In some exemplary embodiments, the shelf further comprises a drawer configured to move on top of the frame through at least one of the longitudinal sides of the modular shelf.

In some exemplary embodiments, the shelf is a modular shelf.

According to yet another aspect of the present disclosed subject matter, a method for assembling and conveying a rack comprising: mounting a modular shelf having a plurality of struts by engaging the plurality of struts with corresponding struts of another modular shelf to assemble a rack; wherein the rack comprises one or more modular shelves; securing the modular shelves by twist locking all corresponding struts; utilize a plurality of the horseshoes of the modular shelf for lifting at least one modular shelf on or off a conveying vehicle anchoring the struts of a bottom modular shelf of the rack to corresponding twist lock of the conveying vehicle before conveying the rack to or from the site; and tilting at least one guardrail of a modular shelf to enable drawing a drawer thru the longitudinal side of the shelf for unloading content placed on the drawer.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings:

FIG. 2A illustrates a perspective view of a shelf, in accordance with some exemplary embodiments of the disclosed subject matter;

FIG. 2B illustrates a perspective view of a section of the shelf bottom, in accordance with some exemplary embodiments of the disclosed subject matter;

FIG. 7 illustrates a perspective view of a frame, in accordance with some exemplary embodiments of the disclosed subject matter;

FIG. 7A illustrates a perspective view of a strut, in accordance with some exemplary embodiments of the disclosed subject matter;

FIG. 7B is a detail perspective view depicting wheel-bearings in a section of the another shelf, in accordance with some exemplary embodiments of the disclosed subject matter;

DETAILED DESCRIPTION

Figure 1:
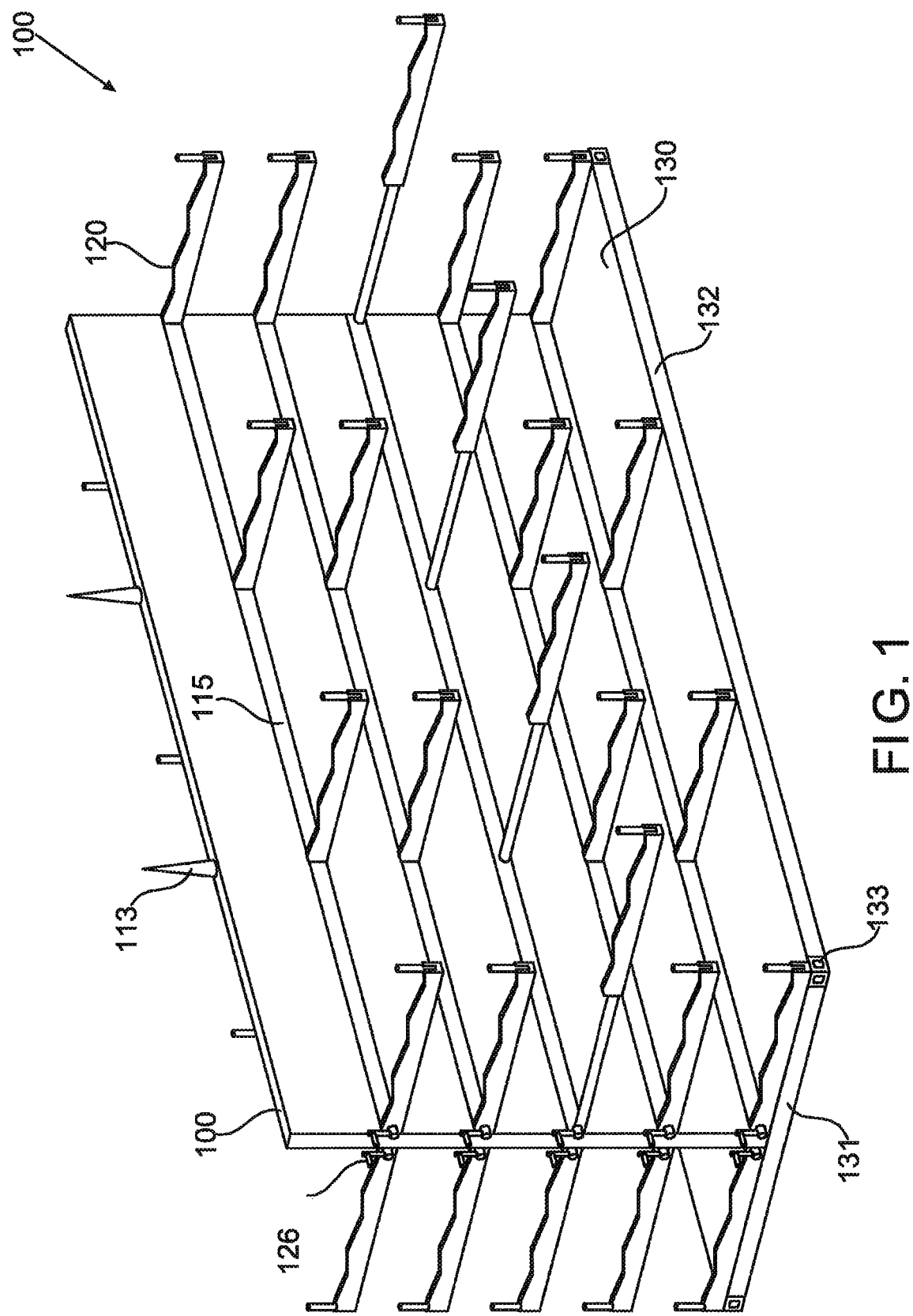
FIG. 1 illustrates a perspective view of a rack, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

According to one aspect of the present disclosure a rack is provided. The rack may comprise connectors corresponding to a vehicle matching connectors. The rack may be based on a frame which comprises fittings complying with the matching connectors. And a plurality of modular shelves configured to be mounted one on top of the other and on the frame. Furthermore, each modular shelf of the plurality of modular shelves comprises a wall that is vertical with respect to the frame. The wall has two sides, wherein each side comprises: a plurality of arms that can simultaneously extracted and retracted, the arms are also capable to move along the wall.

According to another aspect of the present disclosure another rack is provided. The rack may comprise connectors corresponding to a vehicle matching connectors. The rack may be constructed of a plurality of modular shelves that has two longitudinal sides. The modular shelves are configured for mounting one on top of the other. Each modular shelf of the plurality of modular shelves can comprise: a frame that has a plurality of struts that are utilized for mounting one modular shelf on top of another. The bottom portion of each strut has fitting that comply with the matching connector. Each modular shelf may be equipped with guardrail connected on each longitudinal side of the shelf's frame and at least one of the guardrails is capable of tilting/moving/swinging between an upright position and a horizontal position. The shelf may also comprise a drawer capable of moving/sliding on top of the frame through at least one of the longitudinal sides of the modular shelf.

According to yet another aspect of the present disclosure a shelf is provided. The shelf has two longitudinal sides and it is based on a frame that has a plurality of struts configured for mounting a modular shelf on top of another shelf with corresponding struts. The longitudinal sides the frame may be equipped with guardrails, wherein at least one of the guardrails is capable of tilting/moving/swinging between an upright position and a horizontal position.

According to yet another aspect of the present disclosed subject matter, a method for assembling and conveying a rack may comprise: mounting a modular shelf having a plurality of struts by engaging the plurality of struts with corresponding struts of another modular shelf to assemble a rack. The rack may comprise at one or more modular shelf which may be secured to one another by twist locking all corresponding struts of the shelves. a plurality of the horseshoes of the modular shelf may be utilized for lifting at least one modular shelf on or off a conveying vehicle. The struts of a bottom modular shelf of the rack may be also used for anchoring the rack with corresponding twist lock of the conveying vehicle before conveying the rack to or from the site. By tilting at least one guardrail of a modular shelf may enable drawing a drawer thru the longitudinal side of the shelf for unloading elongated material placed on the drawer.

Referring now to FIG. 1, illustrating a perspective view of a rack 100, in accordance with some exemplary embodiments of the disclosed subject matter. Rack 100 may be utilized for conveying and stowing bulk of elongated materials, which are typically used in construction sites. The elongated materials may comprise, but not limited to, pipes, steel rods, lumber, tubes; beams; steel net, iron profiles, reinforcing steel bars (rebars), a combination thereof, or the like.

In some exemplary embodiments of the disclosed subject matter, rack 100 may be an assembly comprising a frame 130 and a plurality of modular shelves 110 that are mounted one on top of the other. A plurality of longitudinal beams 132 and a plurality of crossbeam 131 form the frame 130 that may comprise corner fitting(s) 133 at each corner of the frame. In some exemplary embodiments, a bottom shelf, such as shelf 110, may be mounted to the frame 130 in the same manner shelves 110 are mounted one on top of the other. Additionally, or alternatively, the bottom shelf may be an integral part of frame 130 or permanently affixed to frame 130, and may comprise shelf engagement means (i.e., a plurality of pins along the frame 130 longitudinal axis) for engaging a modular shelf 110 above.

In some exemplary embodiments, the rack 100 may be populated with elongated material offsite at a facility, such as a factory, warehouse, or the like; and transported to a construction site by a vehicle, such as flatbed truck, a trailer, a semitrailer, or the like. In such embodiments, the overall length of rack (i.e., the length of longitudinal beams 132) may not exceed the vehicle length or allowable excess load according to the transportation code of country in which the present disclosure may be utilized. Most country adhere to the length of commercial cargo containers, typically ranging between 20 to 40 feet, however, some exceptions may allow a longer rack that may exceed the vehicle length. Additionally, rack 100 may be secured to a vehicle, such as a trailer, a flatbed truck or semitrailers, in the same manner cargo containers are secured. It should be noted that corner fittings 133 may be utilized for affixing the rack 100 to the vehicle by a twist-lock rotating connector of the vehicle (to be described later in FIG. 4).

In some exemplary embodiments, a solid base, such as a shipping container's floor, i.e. is ready with housings spaced apart to fit the positions of the twist-lock mechanism on the flatbed. Such base may be produced by separating the floor of a used shipping container from walls of the container and affixing thereto the wall section.

Referring now to FIGS. 2A and 2B illustrating perspective views of shelf 110, in accordance with some exemplary embodiments of the disclosed subject matter. Each shelf 110, of the plurality of shelves 110, comprises a vertical wall 112, and shelf engaging elements such as a plurality of pins 113 acting as male engaging elements situated on an upper portion of the wall, and a plurality of matching bores 114 (enlarged perspective bottom view FIG. 2B) situated in the lower portion of the wall. In some exemplary embodiments, the bores 114 may be formed with a lead-in chamfer to facilitate pins 113 insertion into the bores 114. To form the rack 100, the shelves 110 may be mounted one on top of the other by aligning the walls so that the engaging elements are engaged together. The shelves are mounted one on top of the other by a crane, a forklift, a combination thereof, or the like, in order to facilitate the mounting process while a solid wall is built forming a rack 100 with two sides separated by the solid wall that is vertical with respect to frame of the rack.

Each shelf 110 further comprises a plurality of arms 120, attached to each side of wall 112 so that arms 120 are provided on opposite sides of the rack. The arms 120 are capable of stably receiving elongated materials (EM) 10. It will be noted that the rack 100 is loaded and unloaded in a way that the loads (moments) created by the EM 10 on the arms are balanced between the opposite sides of the rack 100. Since the shelves lacks panels that are perpendicular to the wall panel, EM10 are engaged only by arms 120. In some exemplary embodiments, stirrups (EM 10 with a least one bent) may be placed on the arms with the bent part facing down, to allow efficient stacking of EM 10 and use of space. It should also be noted that the concept of using arms is advantageous over using panels, for instant, since the arms may allow easy access to the EM 10, with a forklift for example.

Since the EM10 may come in various lengths, it is preferable that arms 120 will be able to slide/move along wall 112 of the shelf 110 in order to match the EM 10 various lengths. In some exemplary embodiments, the plurality of arms 120 or a portion of the plurality of arms 120 may be connected to wall 112 of the shelf 110 by slot 115 that extend along wall 112. Thus each arm of the plurality of arms is capable of sliding/moving, along wall 112, to a desired position and then locked so that further movement is prevented until the EM10 are removed. In some exemplary embodiments, the arms adjacent to the ends of the slot 115 are affixed to the slot. It should be noted the terms slide, move or sliding, moving are used in the present disclosure interchangeably Referring now to FIGS. 3A to 3D, illustrating side views of rack 100 and arms 120 as well as perspective views of chock 125 and crank handle 126, in accordance with some exemplary embodiments of the disclosed subject matter.

Figure 3A:
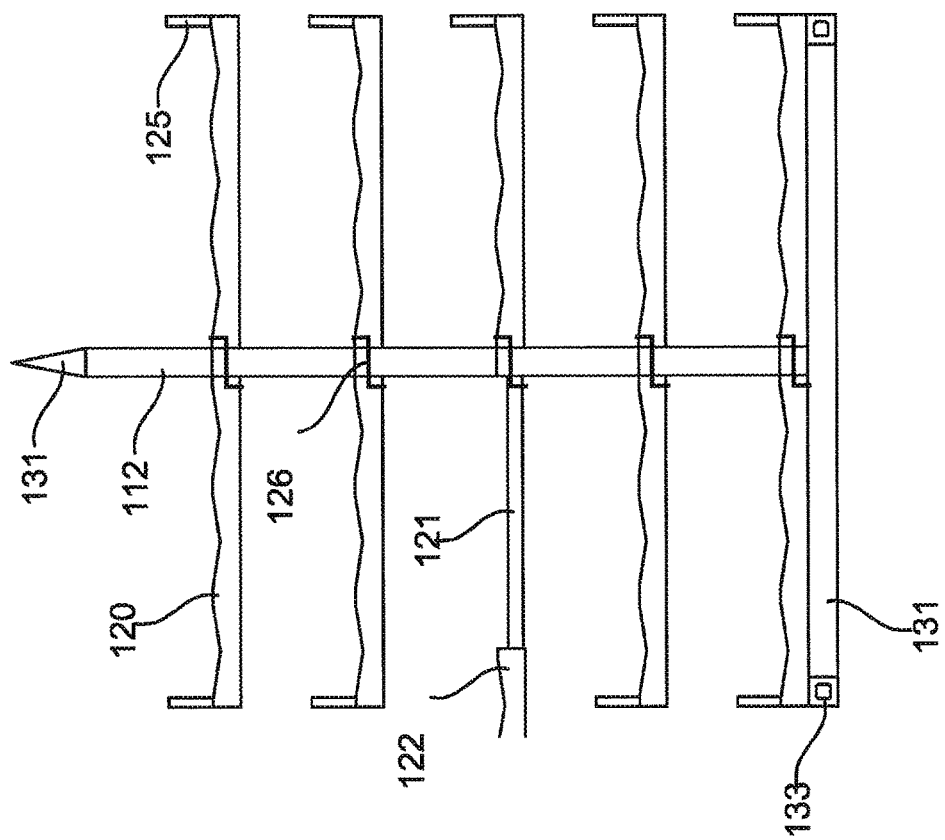
FIG. 3A illustrates a side view of the rack, in accordance with some exemplary embodiments of the disclosed subject matter.
Figure 3B:
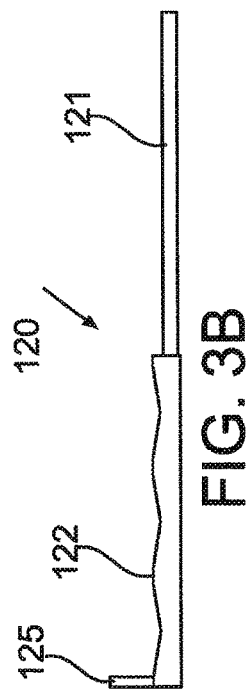
FIG. 3B illustrates a side view of an arm in extended condition, in accordance with some exemplary embodiments of the disclosed subject matter.

FIG. 3B illustrates the components that form an arm 120, in accordance with some exemplary embodiments of the disclosed subject matter. The components that make up arm 120 may be comprised of member 121, sleeve 122 and chock 125. In some exemplary embodiments, member 121 may be connected (secured) to wall 112 of the shelf 110 via slot 115, while sleeve 122 may be configured to be extracted from member 121, away from wall 112. Chock 125 (FIG. 3C) may be secured to the end of sleeve 122 (namely, the far end of the arm with respect to the wall) by a hinge (not shown). In an upright position to the arm's sleeve so as to prevent the EM10 from rolling off the shelf. While unloading or uploading the EM 10 off the shelf, the chock 125 is turned about the hinge to a position in which it doesn't disturb the loading.

It should be noted that the utilization of rack 100 may be founded on two basic modes of operation: mode 1 and mode 2. Mode 1 may comprise transporting rack 100, transporting at least one shelf 110, storage, or the like; mode 2 may comprise loading and unloading the EM10 off the shelves. In mode 1, all sleeves 122 of all arms 120 are retracted toward wall 112, and chock 125 is in an upright position to prevent the EM10 from inadvertently rolling on or off the arms 120.

Additionally or alternatively, sleeve 122 shape may be undulation in order to provide a small partition between adjacent bundles of EM10 on the arm, yet allowing them to be pulled out with minimal resistance. Each such undulation may be approximately 35-45 cm long and there are typically three on each arm. Other embodiments may comprise other geometries such as recesses or grooves; however, fetching and stowing EM10 on the arms is easy to perform.

In mode 2, the plurality of sleeves of the plurality of arms of any shelf may be extracted simultaneously, to allow access to the EM10, such as depicted in the example in FIG. 3A, showing an extracted left-side of a middle shelf. Since the rack 100 may not reside on an even surface, extraction and or retraction of sleeves 122 (of any shelf) when EM10 are loaded may require considerable exertion of force. In some exemplary embodiments, each side of each shelf 110 may comprise a winch or similar leverage coupled with a dedicated crank handle 126, depicted in FIGS. 3D and 3A. The leverage (not shown) is configured to allow applying leverage to the plurality of sleeves of each side of any shelf by its dedicated crank handle 126 to extend and/or retract the side shelf simultaneously. It will be noted that in mode 2, the chock 125 can be reclined or removed, to downward position, to allow manual rolling or otherwise moving the EM 10 in or out.

Figure 3C:
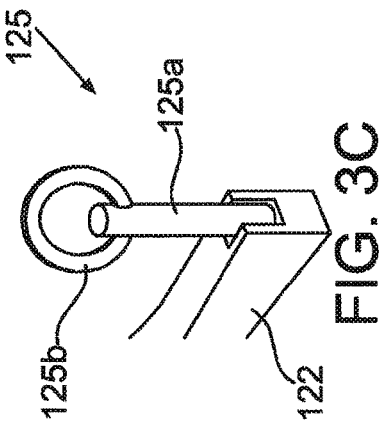
FIG. 3C illustrates a perspective view of a chock at the arm end, in accordance with some exemplary embodiments of the disclosed subject matter.
Figure 3D:
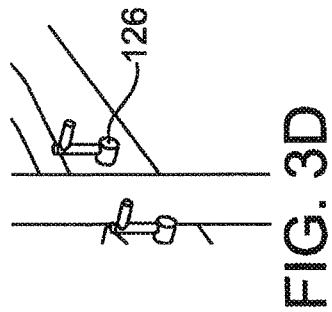
FIG. 3D illustrates a perspective view of a crank handle for extending the arm, in accordance with some exemplary embodiments of the disclosed subject matter.

As shown in FIG. 3C, chock 125 may be comprised of a rod 125a and a ring 125b. In some exemplary embodiments of mode 1, rings 125b located in the four corners of shelf 110 may be utilized for lifting at least one shelf of the rack 100 or stacking at least one shelf on the rack 100. The lifting may be done in facility where the EM 10 is populated or in a site for conveying at least one shelf to a different location in the site. The lifting in the factory, warehouse, construction site, or the like may be done by a crane, hoist, winch, a combination thereof, or the like. It will be noted that four hooks of a crane or other lifting means may be engaged with the four corner rings 125b to lift the shelf 110. Alternatively, the four hooks of the lift means may be engaged with other four rings 125b as long as they are symmetrically located along the shelf 100 to allow the rack 100 or shelf 110 to be safely lifted.

Figure 4A:
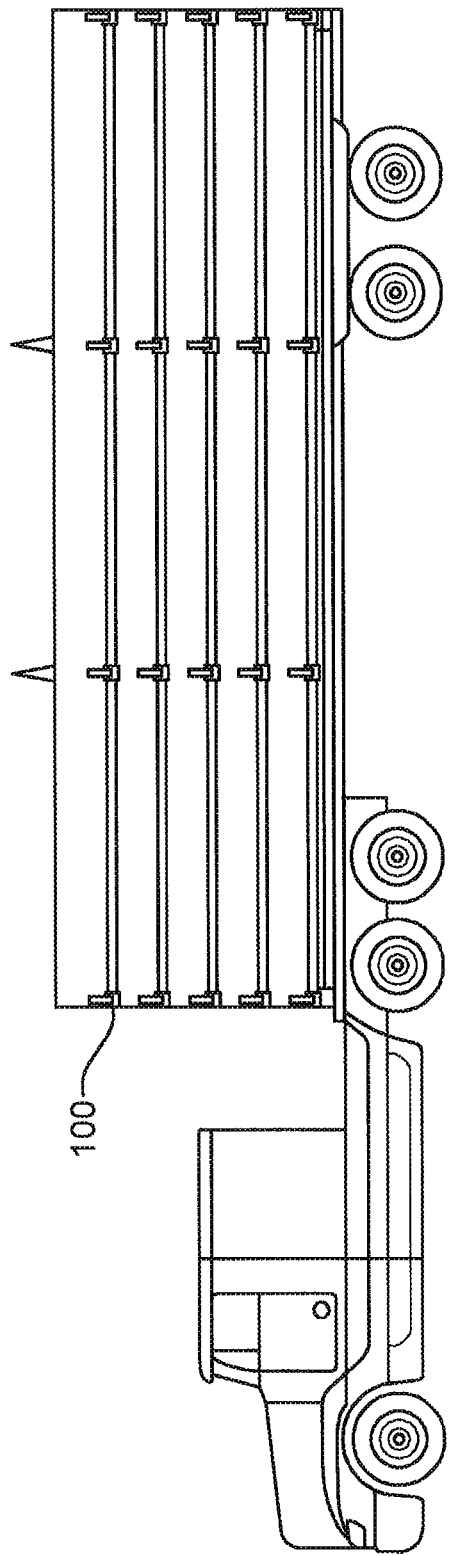
FIG. 4A illustrates a side view of a rack loaded on a trailer, in accordance with some exemplary embodiments of the disclosed subject matter.
Figure 4B:
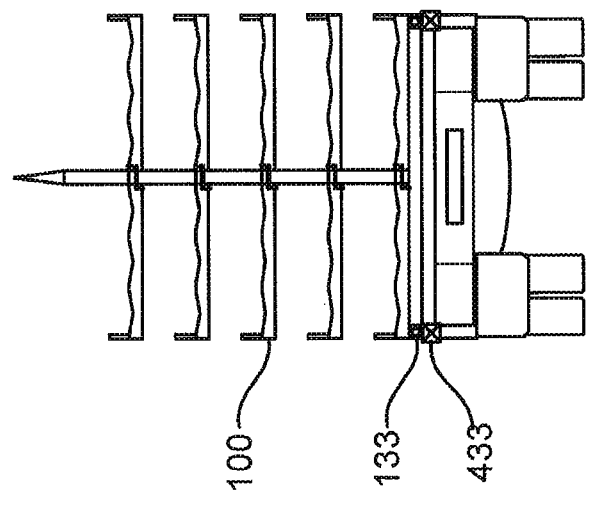
FIG. 4B illustrates a rear view of a rack loaded on a trailer, in accordance with some exemplary embodiments of the disclosed subject matter.
Figure 4C:
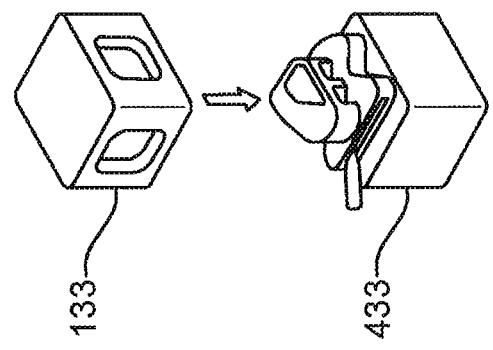
FIG. 4C illustrates a perspective view of a corner fitting and twist-lock connectors, in accordance with some exemplary embodiments of the disclosed subject matter.

Referring now to FIGS. 4A to 4C illustrating side and rear views of rack 100 loaded on a trailer, as well as a perspective view of corner fitting 133 and twist-lock 433 in accordance with some exemplary embodiments of the disclosed subject matter.

The rack 100 can be populated at the facility in advance of being transported to a construction site. A vehicle may arrive at the facility and immediately be loaded with the preloaded rack 100 instead of being slowly loaded with bundles of EM10. Similarly, the rack 100 can immediately be unloaded at the construction site rather than being slowly unloaded. Using a truck having a side lift allows the rack 100 to be loaded and unloaded by the truck driver alone, two pairs of hooks (of the side lift) on each side of the rack 100 may be utilized to engage with the four corner fittings 133. While in transportation, as shown in FIGS. 4A and 4B, the rack 100 may be secured to the flatbed trailer/semi-trailers in the same manner that cargo containers are secured to a flatbed trailer/semi-trailers. In some exemplary embodiments, each corner of frame 130 of the rack 100 may comprise a corner fitting 133, while standard flatbeds are equipped with a plurality twist locks 433 which are mounted in a distance that matches the distance between the corner fitting 133 of the standard cargo container. Since the corner fitting 133 of the rack comply with standard cargo container, the rack may be secured to the flatbed by inserting the plurality of twist locks 433 into the matching plurality of corner fitting 133 and locking the plurality of twist locks 433 thereto as depicted in FIG. 4C.

In some exemplary embodiments, the order of removal of shelves 110 off the rack 100 at the site may be scheduled per the construction time table. Thus, the stacking of shelves 110 on rack 100 at the facility with EM10 thereon may be done accordingly. An empty rack 100 at a construction site may be returned to the facility and unloaded to the facility floor for repopulation. Two or more racks 100 may be used in tandem to provide a steady supply of EM10, e.g. while one rack 100 is returned empty to the facility a second one remains at the construction site with EM10.

In some exemplary embodiments, the shelves can be secured to each other with fastening means (not shown) such as latches at the ends of the shelves, so that the entire rack 100 may be off/onto the semi-trailer. One of the effects of the present disclosure is that the EM10 are neatly and safely arranged on pull-out shelves, in contrast to lifting bundles of EM10 by a crane where they often irrevocably warped due to their entanglement.

Figure 5:
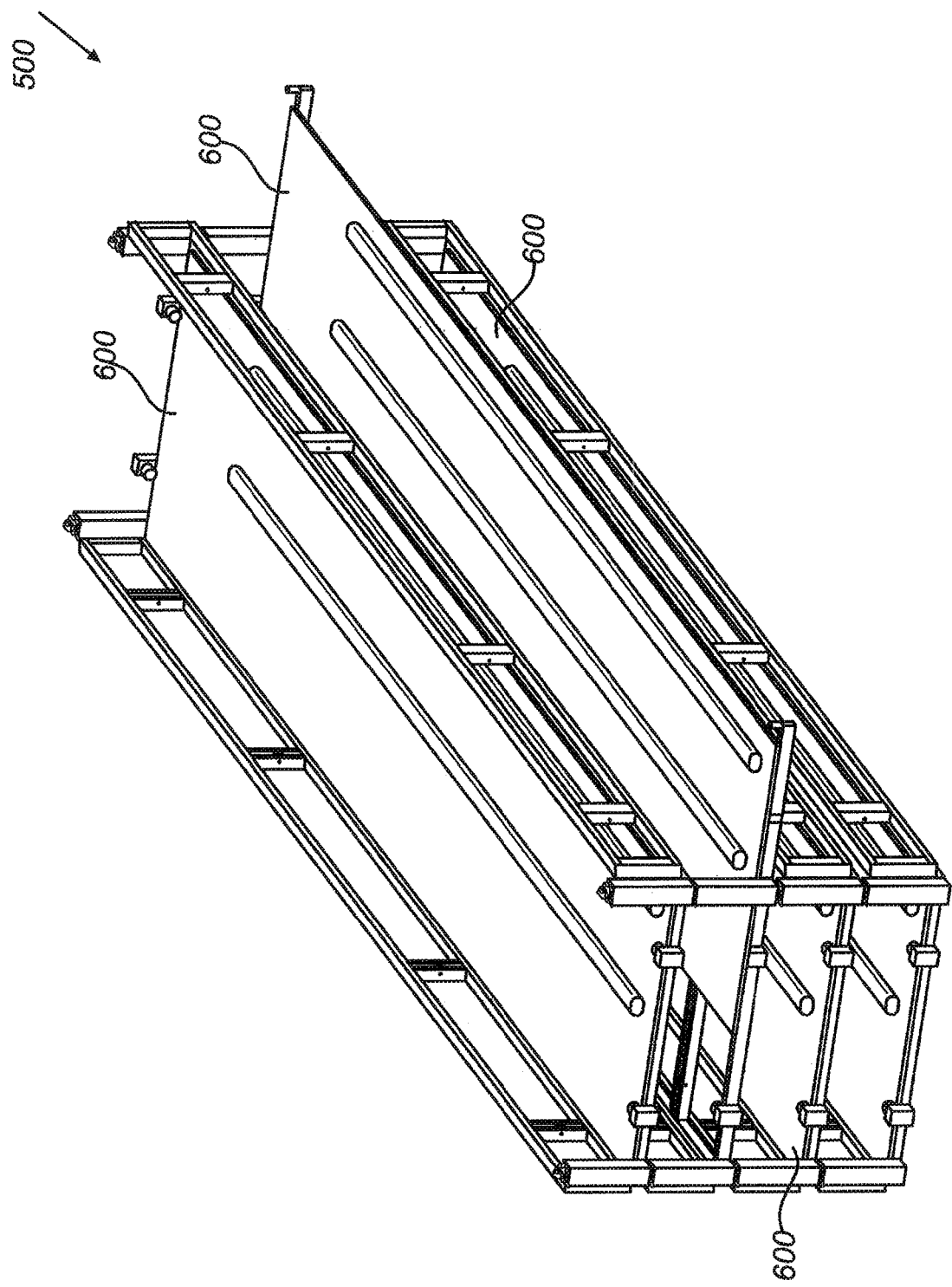
FIG. 5 illustrates a perspective view of another rack, in accordance with some exemplary embodiments of the disclosed subject matter.

Referring now to FIG. 5, showing a perspective view of another rack (rack 500), in accordance with some exemplary embodiments of the disclosed subject matter. Rack 500 may be utilized for conveying and stowing bulk of EM 10, which is typically used in construction sites. The elongated materials may comprise, but not limited to, pipes, steel rods, lumber, tubes; beams; steel net, iron profiles, reinforcing steel bars (rebars), a combination thereof, or the like.

It will be understood that the provided rack 500, by this present disclosure, is yet another embodiment for utilizing a rack, for conveying and stowing bulk of EM 10 in addition to rack 100. Thus, rack 500 may be another technical solution for the same problem the present disclosure addresses, as previously described.

In some exemplary embodiments of the disclosed subject matter, rack 500 may be an assembly comprising a plurality of modular shelves 600 that are mounted and secured one on top of the other. The footprint of rack 500 is typically identical to commercial 20 feet or 40 feet cargo container length by 8 feet width. However, the height of rack 500 may be taller or shorter than the typical cargo container height. Despite the popular footprint described supra the scope of the present disclosure doesn't limit other available or dedicated footprints. Additionally or alternatively, the rack 500 may be also provided in four feet width so that two racks 500 may be situated back to back on a flatbed for transportation. The entire rack 500 as well as the shelves may be secured to one another and to the flatbed trailer/semi-trailers in the same manner that cargo containers are secured to a flatbed trailer/semi-trailers.

Figure 6:
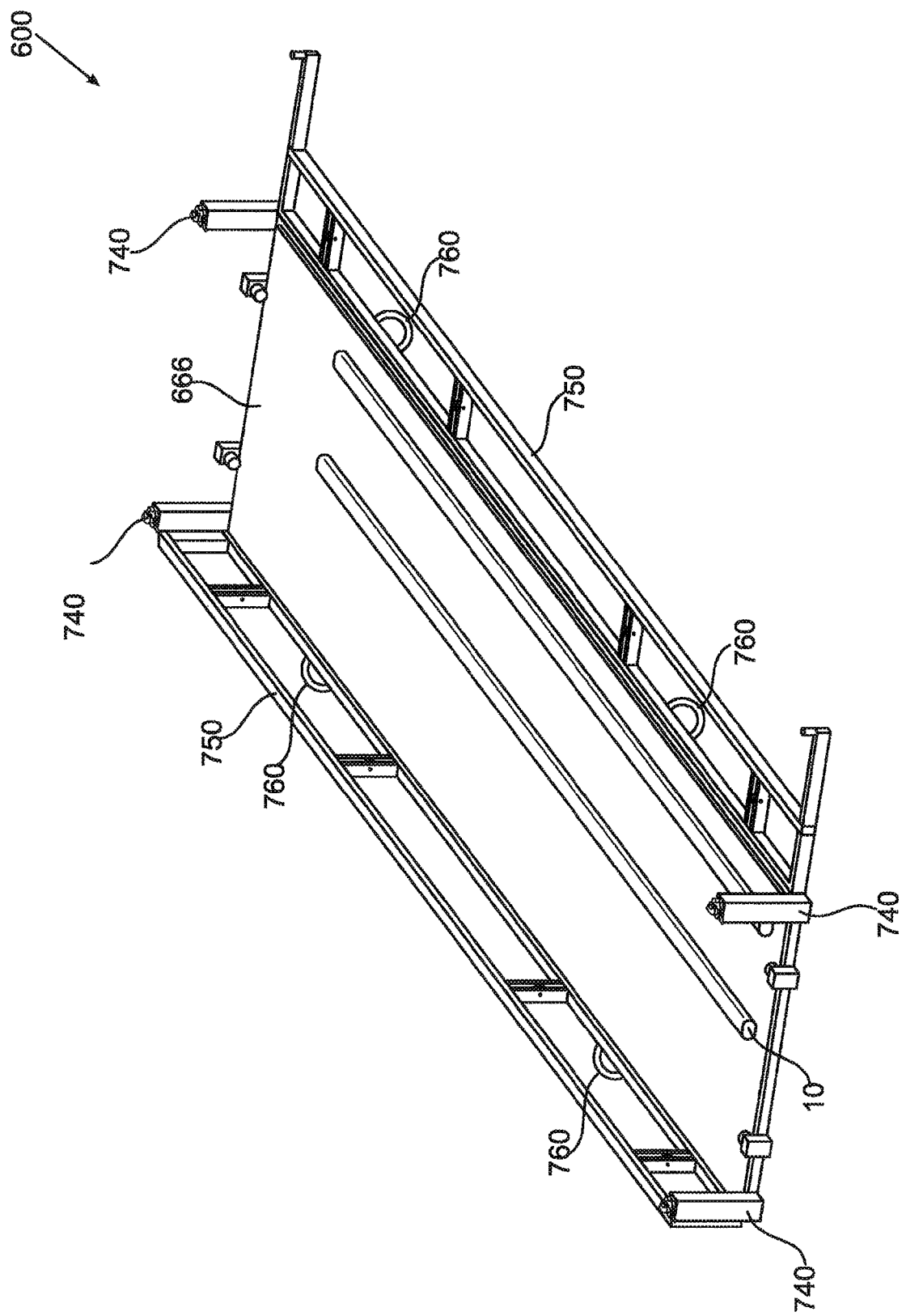
FIG. 6 illustrates a perspective view of a another shelf, in accordance with some exemplary embodiments of the disclosed subject matter.

Referring now to FIG. 6, illustrating a perspective view of a shelf (shelf 600) of a rack, in accordance with some exemplary embodiments of the disclosed subject matter. Shelf 600 comprises a frame 700 (partially shown in FIG. 6), a drawer 666, a plurality, and preferably four struts 740, at least one, and preferably two guardrails 750, and a plurality of horseshoes 760. In some exemplary embodiments, drawer 666 is used to carry the EM 10. While in mode 1, guardrails 750 of shelf 600 are tilted to the up-right position to prevent the EM10 from inadvertently fall off the drawer 666. In some exemplary embodiments of mode 1, the plurality of horseshoes 760 may be utilized for hoisting at least one shelf 600 of the rack 500 or stacking the least one shelf 600 on the rack 500. The struts 740 may be used for securing the plurality of shelves 600 to one another as well as the entire rack 500 to a flatbed trailer/semi-trailers in the same manner that cargo containers are secured to a flatbed trailer/semi-trailers.

In some exemplary embodiments of mode 2, drawer 666 may be pulled outwardly to either one of the elongated sides of the shelf by sliding/moving the drawer over the frame 700. Tilting the guardrails 750 on the desired side to a horizontal position allows the drawer to be pulled out and can facilitate as an additional support for sliding drawer 666. In some embodiments, drawer 666 (dummy drawer) may be an integral part of frame 700. Additionally or alternatively, shelves 600 may be provided with only one guardrail 750, thus enabling drawer 666 to slide to one side only. Such embodiments may be preferred for four feet wide rack or shorter. It will be noted that rack 500 may comprise a mix of shelves 600, some with drawer 666 and some with dummy drawer. It will be noted that shelves with dummy drawers may be used in sites where at least one shelf may be transported alone in the site.

Referring now to FIG. 7, showing a perspective view of frame 700, in accordance with some exemplary embodiments of the disclosed subject matter. Frame 700 may be the foundation of shelf 600 on which the drawer 666 may be sliding sideways. Typically, frame 700 has rectangular shape that matches cargo containers footprint and thus, the frame 700 may conform to flatbed trailers/semitrailers twist-lock mechanism for anchoring the frame 700 to a vehicle flatbed. Any other dedicated and compatible footprints are possible as well as other locking mechanisms and the discussed sizes and twist-lock mechanism, by no means, limit the scope of the subject matter.

It will be noticed that contrary to rack 100, rack 500 doesn't require a dedicated frame 130, of FIG. 1; instead, each shelf may serve as the base frame of the rack 500, if placed in a bottom-most position.

At least two longitudinal beams 710, at least two crossbeams 730 and a plurality of rails 720 form the frame 700 that may comprise a plurality of struts 740, preferably four struts one at each corner of the frame. The perspective view of a strut 740 shown in FIG. 7B depicts an iron cast block comprising bottom fitting 743 and a twist lock 744 connectors. Since all shelves of a given rack have identical form, fit and strut 740; they may be stack one on top of the other and be connected to one another by inserting fittings 743 of an upper shelf on top of twist lock 744 of a lower shelf, and lock the twist locks inside the fittings. Stacking a plurality of shelves 600 in the manner described above forms the racks, similarly the rack may be anchored to the flatbed trailer or semitrailer, wherein the twist-locks of the flatbed are used to be locked inside the fittings 743 of the bottom shelf.

In some exemplary embodiments of the disclosed subject matter, strut 740 may be provided in different heights (i.e., the distance between fittings 743 to twist lock 744) which dictate the height of the shelf 600. Clearly, struts 740 of a given shelf must have the same size; however rack 500 may comprise shelves of different heights. Higher shelves may be favored to allow efficient stacking of material, such as EM 10 stirrups; high volume material, large diameter pipes, a combination thereof, or the like.

In some exemplary embodiments, rails 720 are rails having U-shape cross section as shown in FIG. 7C, also showing wheel-bearings 722 assembled inside the rail 720. It will be noted that the wheel-bearings 722 are assembled in a way that they are slightly protrusive above the U-shape rails rim to maintain contact with drawer 666 and facilitate its movement. It will be noted that guardrail 750 may comprise crossbeams that have identical properties as the rail 720, however may be different in length. Once rotated down in mode 2 operation (as shown in FIG. 7) guardrail 750 may become an extension to rails 720 since their crossbeams may also comprise wheel-bearings 722.

In some exemplary embodiments of the disclosed subject matter, drawer 666 of FIG. 6, loaded with EM10 may slide over the plurality of wheel-bearings 722 as needed in mode 2 operation. In order to pull drawer 666 further beyond guardrail 750, extenders 755 may be pulled out from the guardrail 750 in order to prevent the drawer 666 from turning over due to moments created by the EM10. Additionally or alternatively, a plurality of guides 733 mounted along crossbeam 730, which are the external crossbeams of frame 700, are used to keep drawer 666 in track. In some exemplary embodiments, guide 733 may comprise a wheel-bearing that kisses the upper side of drawer 666 (i.e., the side in contact with EM10) to assist keeping drawer 666 on track while also preventing the drawer 666 from turning over.

Figure 8B:
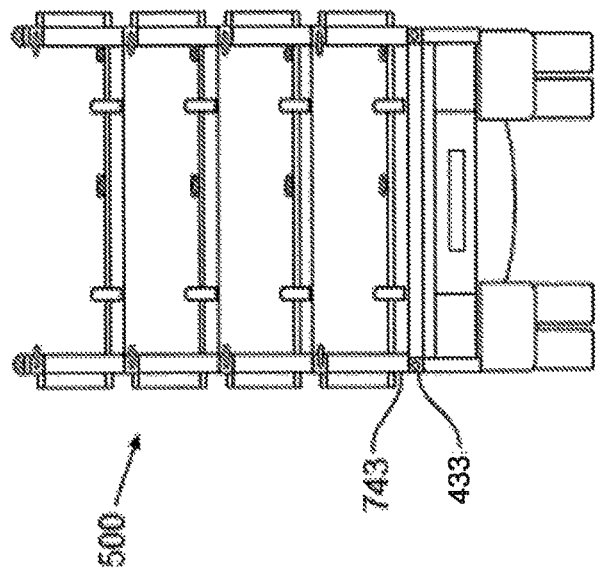
FIG. 8B illustrates a rear view of the another rack loaded on a trailer, in accordance with some exemplary embodiments of the disclosed subject matter.
Figure 8A:
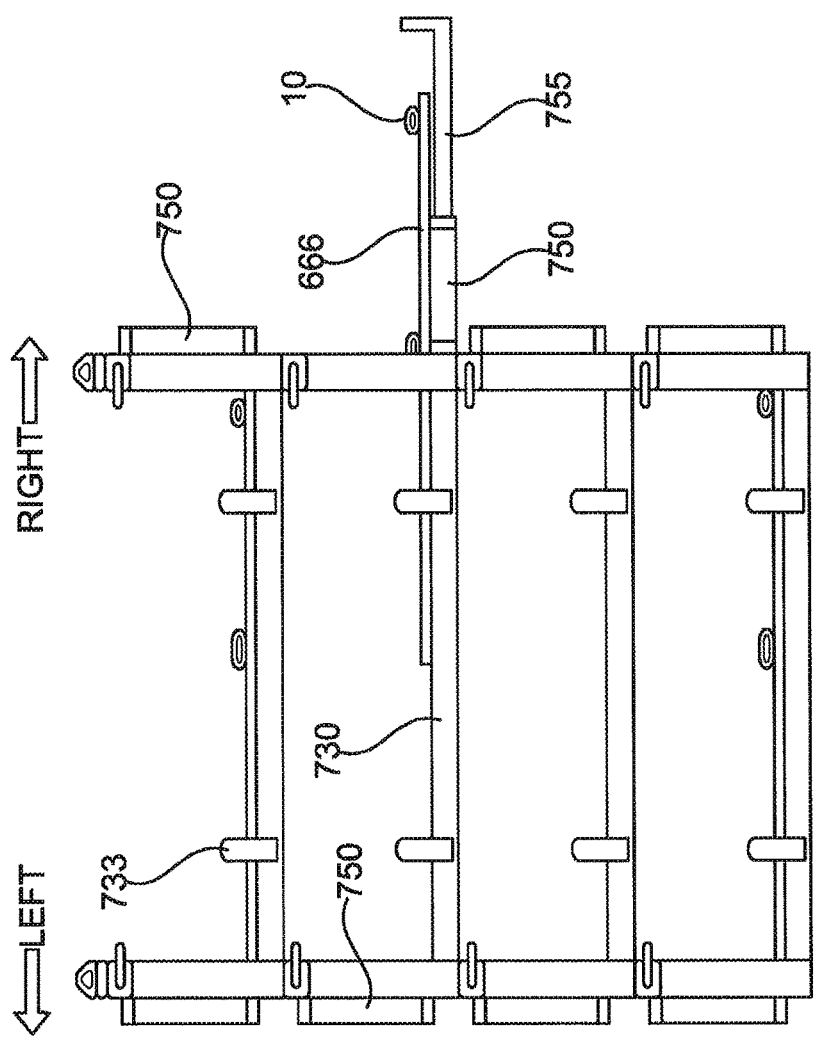
FIG. 8A illustrates a side view of the another rack, in accordance with some exemplary embodiments of the disclosed subject matter.

Referring now to FIGS. 8A and 8B, showing a side view of the rack 500, in accordance with some exemplary embodiments of the disclosed subject matter. As depicted in the FIGS. 8A and 8B, one of the shelves may be used in mode 2 operation where the right side guardrail 750 of the shelf is tilted down and drawer 666 have been pulled out, for accessing the EM10. In some exemplary embodiments, pulling drawer 666 all the way to the end of extender 755 may not clear the entire drawer surface for accessing all EM10 on it. In such case the rest of the EM10 left on the drawer 666 surface may be accessed from the left side of the shelf by tilting the left side guardrail 750 down and pulling drawer 666 from the left side of the shelf.

Referring now to FIG. 8B, showing a rear view of a rack loaded on a trailer, in accordance with some exemplary embodiments of the disclosed subject matter. Using a truck having a side lift allows the rack 500 to be loaded and unloaded by the truck driver alone, two pairs of hooks (of the side lift) on each side of the rack 100 may be utilized to engage with the four corner fittings 433. Additionally or alternatively, rack 500 may be loaded and unloaded shelf by shelf or in some cases more than one shelf at a time, depends on the capability of the lifting means and the weight of each shelf. In some exemplary embodiments, the lifting means described earlier in the present disclosure may comprise four hooks configured to engage with the four horseshoes 760 of the top shelf for loading or unloading. In some exemplary embodiments, the rack may be encored to the flatbed trailer or semitrailer, wherein the twist-locks of the flatbed are locked inside the matching fittings 743 of the bottom shelf.

Figure 9:
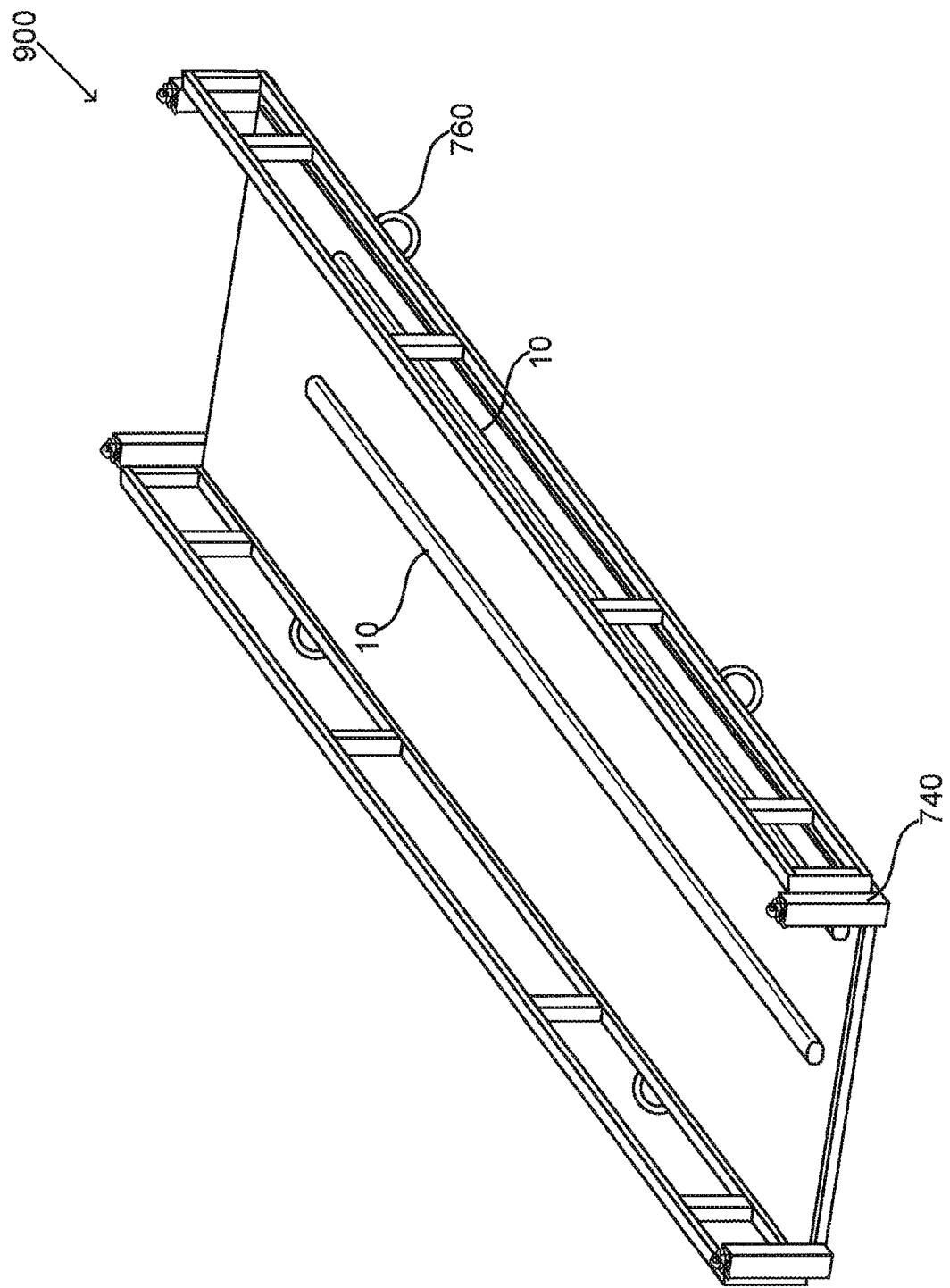
FIG. 9 illustrates a perspective view of a downgraded shelf (DS), in accordance with some exemplary embodiments of the disclosed subject matter.

FIG. 9 illustrates a perspective view of a downgraded shelf (DS) 900, in accordance with some exemplary embodiments of the disclosed subject matter. DS 900 may be identical to shelf 600, however lacking the drawing capability, i.e., without a drawer.

In some exemplary embodiments, a plurality DS 900 may form a DS rack (not shown) for mode 1 operation. It should be noted, that the DS rack may be identical to rack 500, with the exception that it can be used only in mode 1 operation. The plurality of horseshoes 760 may be utilized for hoisting at least one DS 900 of the DS rack, or stacking the least one DS900 on the DS rack. The plurality of struts 740 may be used for securing the plurality of DS900 to one another as well as the entire DS rack to a vehicle, such as a flatbed, a trailer, or/a semi-trailers in the same manner that cargo containers are secured to such vehicle.

Figure 10:
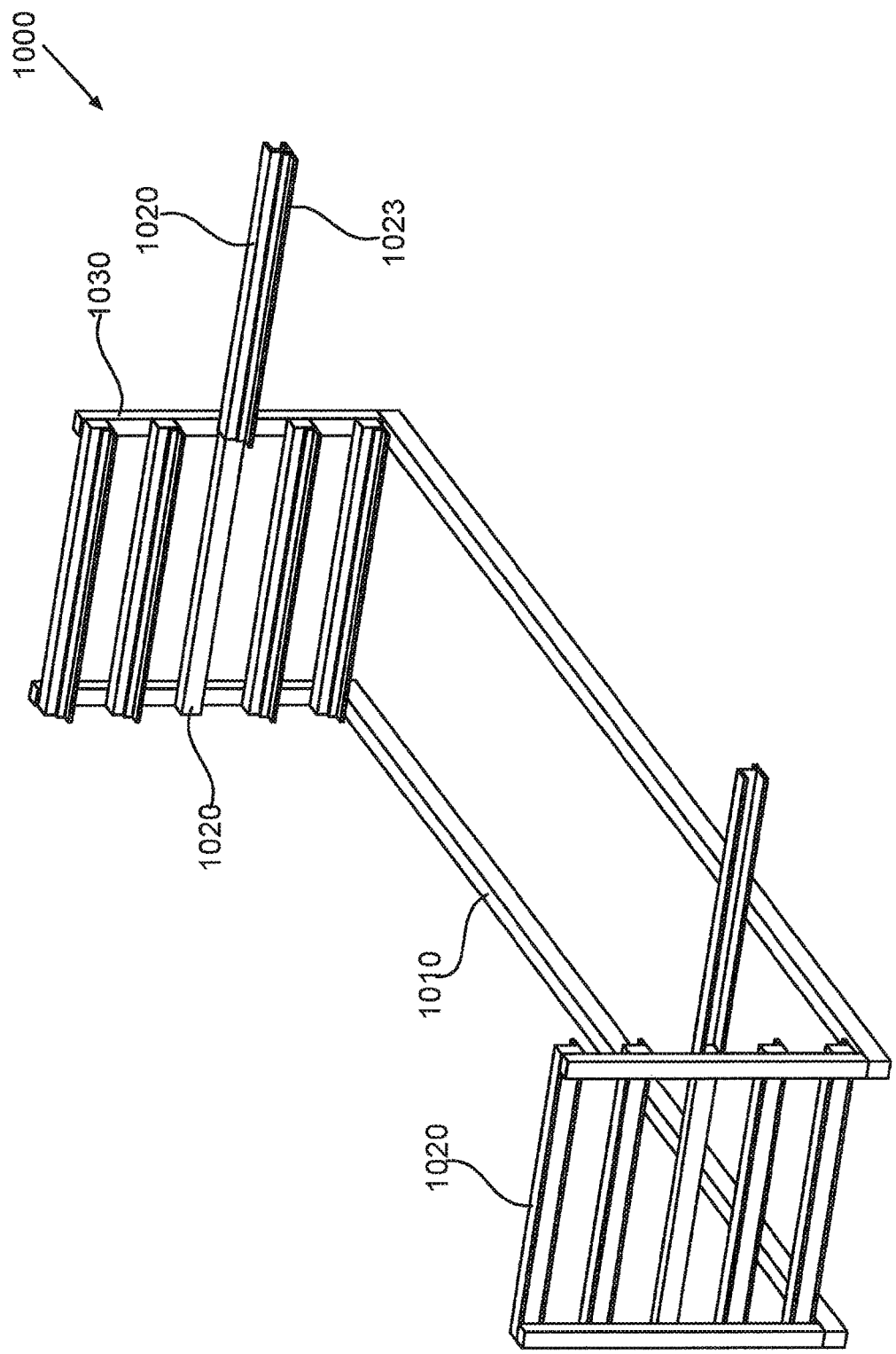
FIG. 10 illustrates a perspective view of a ladder stand (LS), in accordance with some exemplary embodiments of the disclosed subject matter.

FIG. 10 illustrates a perspective view of a ladder stand (LS) 1000, in accordance with some exemplary embodiments of the disclosed subject matter. The LS1000 may be constructed of at least two longitudinal beams 1010; at least four vertical beams 1030, and a plurality of heavy duty sliding rail(s) (HDSR) 1020. In some exemplary embodiments, the at least two longitudinal beams 1010 may reside on the ground or a horizontal surface that is reinforced with concrete, or the like. Each end of the at least two longitudinal beams 1010 may be connected to a vertical beam 1030. The vertical beams 1030 are connected perpendiculars to the at least two longitudinal beams 1010, respectively, and stand upward, so the ends of beams 1010 having beams 1030 are the side of the LS1000. The at least two beams 1030 of each side of the LS100 may be each connected horizontally by a set of the plurality of HDSR 1020. Wherein, each HDSR 1020 of each set, of each side, oppositely face a parallel corresponding HDSR 1020. Additionally, each HDSR 1020 may comprise an L-shape bracket(s) 1023, hence two corresponding HDSR 1020 can provide the DS 900 drawing capability. It should be noted that the distance between the two opposite sets of HDSR 1020 is larger than the overall length of DS 900. Thus, allowing clearance for the DS 900 to be placed on brackets 1023.

It should be noted that the LS1000 may be residing in a construction site or any site that may require AM10. In some exemplary embodiments, the LS1000 may be stationed, in the site vicinity, anchored to the ground, reinforced concrete surface, a combination thereof, or the like. It should also be noted that a DS rack populated with EM10 may be transported to the site by a vehicle; such as flatbed, trailer or semitrailer; in the same manner that rack 500 is transported (as depicted in FIG. 8B). Likewise, using a vehicle having a side lift allows the DS rack to be loaded and unloaded, in the site, by the truck driver alone. Additionally or alternatively, DS rack may be loaded and unloaded one DS 900 at a time with lifting equipment, such as a crane, a hoist a forklift, a combination thereof, or the like. In some exemplary embodiments, the lifting equipment may comprise four hooks configured to engage with the four horseshoes 760 (of FIG. 9) of the DS 900 for loading or unloading. In some exemplary embodiments, the DS rack may be anchored to the vehicle, by locking twist-locks of the vehicle into matching fittings (not shown) of the struts 740 (of FIG. 9) of the bottom shelf.

Figure 11:
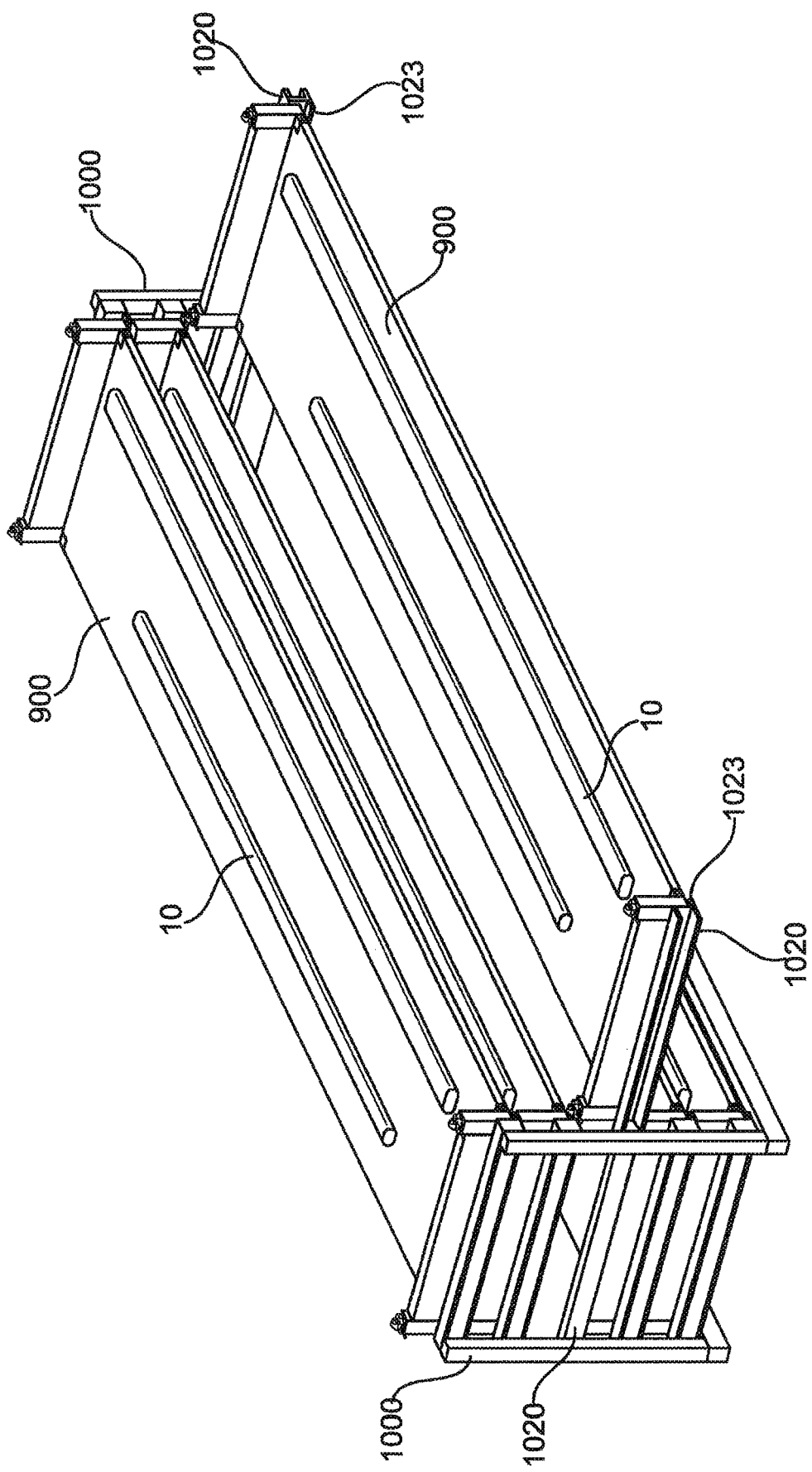
FIG. 11 illustrates a perspective view of the ladder stand populated with a plurality of downgraded shelf, in accordance with some exemplary embodiments of the disclosed subject matter.

FIG. 11 illustrates a perspective view of the ladder stand 1000 populated with a plurality of downgraded shelf 900, in accordance with some exemplary embodiments of the disclosed subject matter. In some exemplary embodiments, a plurality of DS 900 may be placed, lifting equipment, on the L-shape brackets 1023 of two corresponding HDSR 1020 of the stand 1000, one at a time. For example five DS 900 can be placed on corresponding HDSR 1020, as depicted in FIG. 11. It should be noted that while mode 2 operations, a DS 900 placed on two corresponding HDSR 1020 may be drawn thru either longitudinal sides of the stand 1000 by virtue of the HDSR 1020 capability. As an example the DS 900 placed third from the top on stand 1000 may slide on the two corresponding HDSR 1020, as depicted in FIG. 11.

Figure 12:
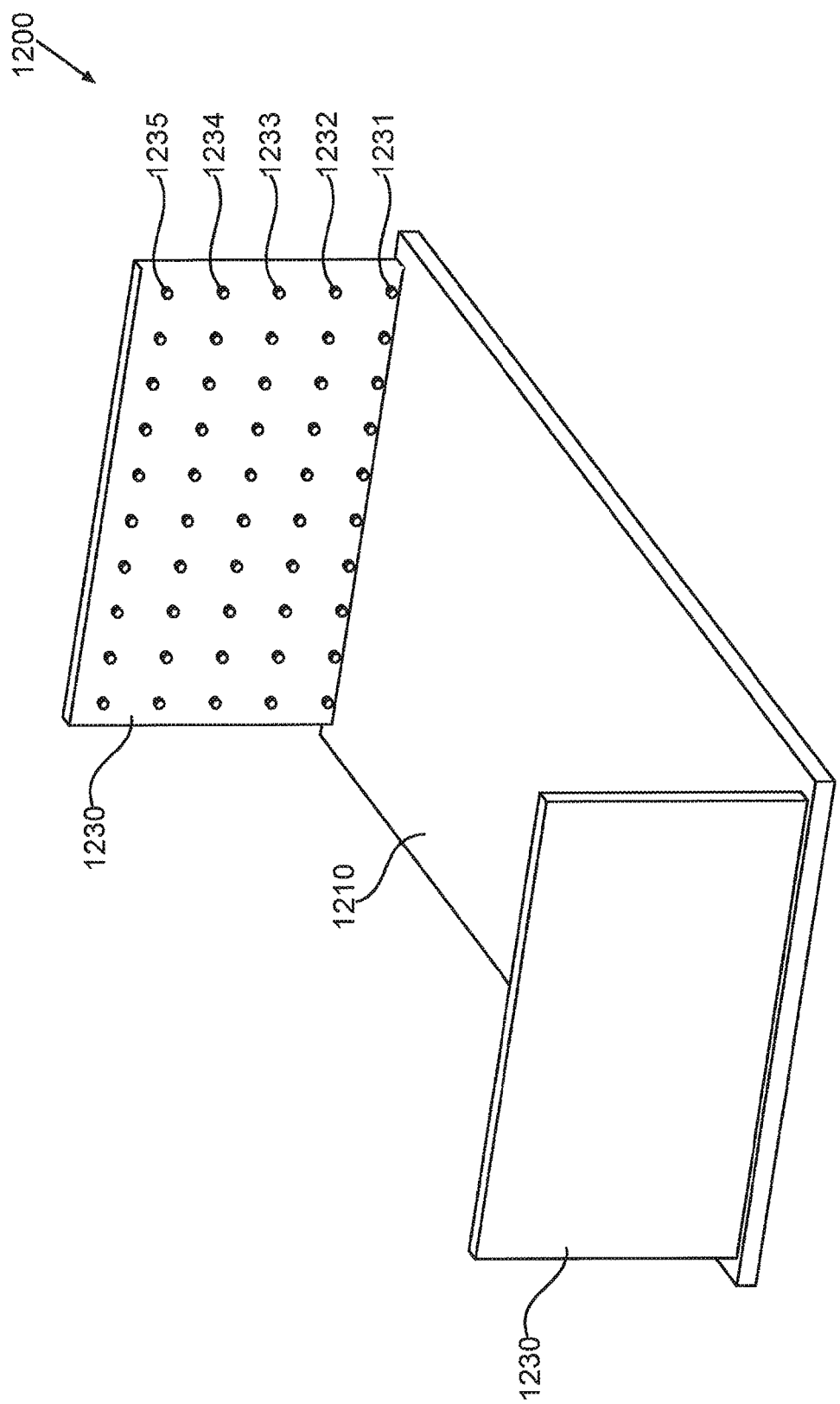
FIG. 12 illustrates a perspective view of a u-stand, in accordance with some exemplary embodiments of the disclosed subject matter.

FIG. 12 illustrates a perspective view of a u-stand 1200, in accordance with some exemplary embodiments of the disclosed subject matter. The u-stand 1200 may be constructed of a horizontal base 1210; two vertical wall(s) 1230, and a plurality of heavy duty wheel bearings. In some exemplary embodiments, the horizontal frame 1210, having a rectangular shape, may reside on the ground or a horizontal surface that is reinforced with concrete, or the like. Two opposite sides of the horizontal base 1210 may each be connected to a vertical wall 1230, as illustrated in FIG. 12. It should be understood that each vertical wall 1230 comprises an inner side and an outer side and that the inner sides of the two vertical walls 1230 face each other when connected to the two opposite sides of the horizontal base 1210. Additionally or alternatively, both inner sides of the vertical walls 1230 comprise a plurality of wheel-bearing rows, preferably five rows on each inner side, such as wheel-bearings rows 1231 thru 1235. Each row of each inner side may comprise a plurality of wheel-bearings, wherein the number of wheel-bearings in each row of each inner side is equal; also, all the wheel-bearings rows are parallel to the horizontal base 1210. In some exemplary embodiments, each row has a corresponding row on the opposite inner side, wherein corresponding rows are parallel to each other.

It should be noted that the distance between two opposite inner sides of the vertical walls 1230 is larger than the overall length of DS 900. Yet, the distance between two corresponding rows; such as for example, the distance between wheel-bearings row 1231 and its corresponding row (not shown) of the opposite inner side; is smaller than overall length of DS 900. Thus, allowing clearance for the DS 900 to settle on two corresponding rows and slide over them.

It should be noted that the u-stand 1200 may be residing in a construction site or any site that may require EM10. In some exemplary embodiments, the u-stand 1200 may be stationed, in the site vicinity, and anchored to the ground, reinforced concrete surface, a combination thereof, or the like. It should also be noted that a DS rack populated with EM10 may be transported to the site by a vehicle; such as flatbed, trailer or semitrailer; in the same manner that rack 500 is transported (as depicted in FIG. 8B). Likewise, using a vehicle having a side lift allows the DS rack to be loaded and unloaded, in the site, by the truck driver alone. Additionally or alternatively, DS rack may be loaded and unloaded one DS 900 at a time with lifting equipment, such as a crane, a hoist a forklift, a combination thereof, or the like. In some exemplary embodiments, the lifting equipment may comprise four hooks configured to engage with the four horseshoes 760 (of FIG. 9) of the DS 900 for loading or unloading. In some exemplary embodiments, the DS rack may be anchored to the vehicle, by locking twist-locks of the vehicle into matching fittings (not shown) of the struts 740 (of FIG. 9) of the bottom shelf.

Figure 13:
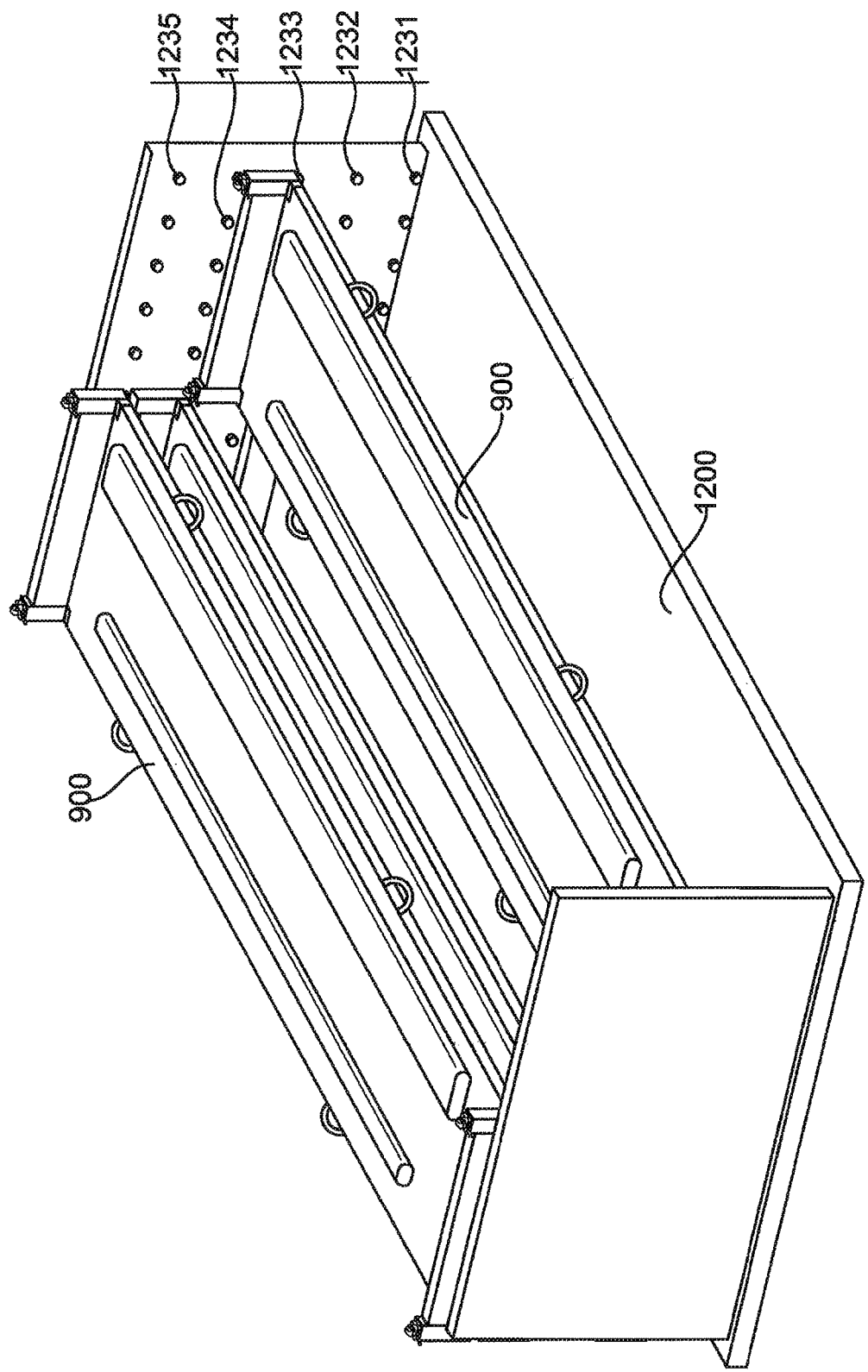
FIG. 13 illustrates a perspective view of the u-stand populated with a plurality of downgraded shelf, in accordance with some exemplary embodiments of the disclosed subject matter.

FIG. 13 illustrates a perspective view of the u-stand 1200 populated with a plurality of downgraded shelf 900, in accordance with some exemplary embodiments of the disclosed subject matter. In some exemplary embodiments, a plurality of DS 900 may be placed, lifting equipment, on two corresponding rows of the u-stand 1200, one at a time. For example five DS 900 can be placed on two corresponding wheel-bearings rows 1231 thru 1235, as depicted in FIG. 13.

It should be noted that the width of the vertical walls 1230 may be double the width of DS 900, so when in mode 2 operations, a DS 900 may slide on two corresponding wheel-bearings rows thru the longitudinal of the stand. As an example the DS 900 placed third from the top on u-stand 1200 may slide on the two corresponding wheel-bearings rows 1233, as depicted in FIG. 13. Additionally or alternatively, the vertical walls 1230 may comprise stoppers (not shown) that prevent the DS 900 from tipping of the u-stand 1200.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A transportable rack for stowing and transporting elongated material, wherein the transportable rack is designed to be transported to a location in a site on a vehicle having connectors, the transportable rack comprising:
   a frame comprising four corner fittings that match the connectors so as to secure the rack to the vehicle;
   a plurality of modular shelves configured to be placed one on top of each other and on the frame, wherein each modular shelf of the plurality of modular shelves comprises:
      a wall that is vertical with respect to the frame and substantially centered to two opposite corners of the four corners, wherein the wall has two sides; and
      a plurality of arms provided on the two sides of the wall for stowing the elongated material, wherein each arm can be extended and retracted, and wherein the arms are capable of sliding along the wall so as to accord the length of the elongated material,
   wherein at least one modular shelf of the plurality of modular shelves can be lifted off the transportable rack and placed in a different location in the site.

2. The transportable rack of claim 1, wherein the connectors are twist locks and wherein the corner fittings are configured to engage with the twist locks.

3. The transportable rack of claim 1, wherein a top side of the wall comprises a plurality of pins and a bottom side of the wall comprises a plurality of matching bores so that when the shelves are placed one on top of the other, the pins and the bores are engaged.

4. The transportable rack of claim 1, wherein the frame further comprises a plurality of pins along its longitudinal axis so that when a shelf of the plurality of modular shelves is mounted on top of the frame, the pins and bores are engaged.

5. The transportable rack of claim 1, wherein each arm comprises a chock positioned at a far end of the arm wherein the chock can be moved between an upright position and downward position.

6. The transportable rack of claim 1, wherein each arm of the plurality of arms comprises a member and a sleeve, wherein the member is connected to the wall, and wherein the sleeve is configured to be extracted from the member away from the wall and vice versa.

7. The transportable rack of claim 6, wherein the member is connected to an elongated slot in the wall so as to allow the member to move along the slot.

8. The transportable rack of claim 6, wherein the sleeve has an undulation shape.

9. The transportable rack of claim 5, wherein the chock comprises a rod and wherein rings are provided on the rod in four corners of the shelf so as to lift the shelf.

10. The transportable rack of claim 1, wherein the plurality of arms is simultaneously extracted and retracted.

11. The transportable rack of claim 1, wherein the frame comprises a modular shelf that is an integral part of the frame.

* * * * *